US009055546B2

(12) United States Patent
Keller et al.

(10) Patent No.: US 9,055,546 B2
(45) Date of Patent: Jun. 9, 2015

(54) HANDLING A REGISTRATION TIMER TO PROVIDE SERVICE CONTINUITY IN IMS

(75) Inventors: Ralf Keller, Würselen (DE); Fredrik Lindholm, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 206 days.

(21) Appl. No.: 13/643,183

(22) PCT Filed: May 3, 2010

(86) PCT No.: PCT/EP2010/055988
§ 371 (c)(1),
(2), (4) Date: Nov. 12, 2012

(87) PCT Pub. No.: WO2011/137926
PCT Pub. Date: Nov. 10, 2011

(65) Prior Publication Data
US 2013/0136058 A1     May 30, 2013

(51) Int. Cl.
H04W 60/00 (2009.01)
H04W 36/00 (2009.01)
H04L 29/06 (2006.01)
H04W 60/04 (2009.01)

(52) U.S. Cl.
CPC .......... *H04W 60/00* (2013.01); *H04W 36/0022* (2013.01); *H04W 60/04* (2013.01); *H04L 65/1073* (2013.01)

(58) Field of Classification Search
CPC ......... H04L 65/1073; H04W 36/0022; H04W 60/00; H04W 60/04
See application file for complete search history.

(56) References Cited

U.S. PATENT DOCUMENTS

| 7,729,705 B2 | 6/2010 | Jung et al. |
| 8,265,090 B2 | 9/2012 | Cai et al. |
| 8,306,507 B2 | 11/2012 | Kim et al. |
| 2003/0027595 A1 | 2/2003 | Ejzak |

(Continued)

FOREIGN PATENT DOCUMENTS

| WO | 2007045264 A1 | 4/2007 |
| WO | 2008071213 A1 | 6/2008 |

(Continued)

OTHER PUBLICATIONS

3rd Generation Partnership Project; "ZTE; The Registration Expiration Time Setting for Enhanced MCS Server Solution"; Technicalspecification Group (TSG) Radio Access Network (RAN); Workinggroup 2 (WG2), Nov. 12, 2007, pp. 1-3; vol. S2-075274.

*Primary Examiner* — Ian N Moore
*Assistant Examiner* — Eric H Wang
(74) *Attorney, Agent, or Firm* — Coats & Bennett, PLLC

(57) ABSTRACT

The invention relates to a method for providing service continuity with respect to a registration of a mobile terminal, UE (1), at a control server (3) of an IP Multimedia Subsystem, IMS, network, while a CS-communication session between the UE (1) and a switching server, MSC (2), of a circuit-switched, CS, network is established. The control server (3) comprises a registration timer which is used for initiating a termination of the registration of the UE (1) at the IMS network, when the registration timer expires, wherein the control server (3) updates the registration timer in dependence of a control information received (11, 24) from the MSC (2). The invention further relates to a MSC (2) providing such service.

12 Claims, 4 Drawing Sheets

(56) References Cited

U.S. PATENT DOCUMENTS

| | | |
|---|---|---|
| 2004/0205212 A1 | 10/2004 | Huotari et al. |
| 2005/0009520 A1 | 1/2005 | Herrero et al. |
| 2008/0108348 A1 | 5/2008 | Kottilingal et al. |
| 2008/0117893 A1 | 5/2008 | Witzel et al. |
| 2008/0120702 A1* | 5/2008 | Hokimoto ........................ 726/4 |
| 2008/0172486 A1* | 7/2008 | Danne et al. .................. 709/224 |
| 2008/0316998 A1 | 12/2008 | Procopio et al. |
| 2009/0005048 A1 | 1/2009 | Bae et al. |
| 2009/0097398 A1* | 4/2009 | Belinchon Vergara et al. ............................ 370/216 |
| 2009/0276532 A1* | 11/2009 | Bishop ........................ 709/228 |
| 2010/0115110 A1 | 5/2010 | Hao |
| 2010/0118861 A1* | 5/2010 | Witzel et al. .................. 370/352 |
| 2011/0134843 A1* | 6/2011 | Noldus et al. ................. 370/328 |

FOREIGN PATENT DOCUMENTS

| | | |
|---|---|---|
| WO | 2009067061 A1 | 5/2009 |
| WO | 2009142473 A1 | 11/2009 |

* cited by examiner

HANDLING A REGISTRATION TIMER TO PROVIDE SERVICE CONTINUITY IN IMS

TECHNICAL FIELD

The present invention relates to providing service continuity with respect to a registration of a mobile terminal, UE, at a control server of an IP Multimedia Subsystem, IMS, network. The invention further relates to switching servers, MSCs, providing such service.

BACKGROUND

Mobile communication networks are currently evolving from circuit switched (CS) networks towards packet switched (PS) networks, and by that integrate into IP based infrastructure that are e.g. used for the Internet, the World Wide Web and the datacom industry. With this trend mobile networks closely follow the evolution steps of the wireline networks, where Voice over IP (VoIP) via DSL access or via WLAN access is existing technology today.

So-called IP Multimedia Subsystem (IMS) networks have been developed for delivering multimedia services to mobile terminals (e.g. to GSM terminals) being designed according to the well-known standard named Global System for Mobile Communication (GSM), or to Wideband Code Division Multiplex Access (WCDMA) stations. Hereto, calls from and to subscribers of the multimedia services using a CS access are routed through the IMS network in order to reach an IMS service engine. This concept is called IMS Centralized Services (ICS) being described in the standardization document TS 23.292, release 8, of the so-called Third Generation Partnership Project (3GPP) that is a standardization body to produce globally applicable technical specifications.

A further 3GPP standard document in this scope is TS 23.237 (current release 10.1) specifying architectural requirements and procedures for delivery of PS-CS or CS-PS IMS Service Continuity.

In the frame of the 3GPP, further a project called Long Term evolution (LTE) has been established to enhance the UMTS mobile phone standard to cope with future requirements. Within this project, the packet core is being developed to the so-called Evolved Packet Core (EPC) forming a part of the Evolved Packet System (EPS) that supports the so-called evolved UMTS Terrestrial Radio Access Network (eU-TRAN) being a new packet oriented radio access (PS access network).

As part of the 3GPP standardization, e.g. being described in the document TS 23.216 (current release 9.3), work on call continuity for terminals equipped with single radio means (i.e. terminals with one single radio transmitter and one single radio receiver thus being capable of transmitting/receiving on only one of PS- or CS-access at a given time) being referred to as Single Radio Voice Call Continuity (SR-VCC) is ongoing, enabling to transfer an IMS voice call from the EPS to the CS and vice versa.

According methods described in the above-cited document TS 23.216, SR-VCC between PS access and CS access is based on the principle that an MSC being enhanced for SR-VCC, also being referred to as evolved MSC (eMSC), initiates a session transfer towards an application server being dedicated to maintain service continuity when handing over from an actual access network to a target access network, also being referred to as Service Centralization and Continuity Application Server (SCC-AS).

To perform a fast handover from the CS network to the PS network and vice versa, the UE should preferably already be registered in the IMS network and having at least a signaling bearer in the PS network when the handover takes place.

When the UE moves from one access network to another access network, there is a possibility that the registration of the UE in the IMS network will expire because of a missing PS bearer support for an IMS re-registration. This could happen if the UE, having an ongoing CS call, enters an access network, which does not support simultaneous PS and CS bearers, e.g. Global System for Mobile communications (GSM) networks or Enhanced Radio Access Networks (GE-RAN) not having a Dual Transfer Mode (DTM) support.

SUMMARY

It is an object of the present invention to perform an improved registration of a mobile terminal in an IMS network. This object is achieved by the independent claims. Advantageous embodiments are described in the dependent claims.

According to embodiments of the invention, it is assumed that a CS-communication session between a mobile terminal, UE, and a switching server, MSC, of a circuit-switched, CS, network is established and that the UE is registered at a control server of an IP Multimedia Subsystem, IMS, network. The CS-communication session between the UE and the MSC can either has been initiated when the UE is camping on CS or has been initiated in a PS network, and then transferred to the CS network using the Single Radio Voice Call Continuity (SR-VCC) procedure. The SR-VCC procedure as e.g. been mentioned in the 3GPP standard TS 23.216, Version 9.3.0, provides a service continuity of Multicast and Broadcast services, when the access system changes and the corresponding services are provided in the target access system. Therefore the call of the UE is anchored in the IMS network. The MSC, enhanced for SR-VCC, initiates the session transfer procedure to IMS and coordinates it with the CS handover procedure to the target cell. It then sends a PS-CS handover response to a Mobility Management Entity (MME) of the PS network, which includes the necessary CS handover command information for the UE to access the CS network.

Further more, the control server comprises a registration timer which is used for initiating a termination of the registration of the UE at the IMS network, when the registration timer expires. To provide a service continuity for the registration of the UE at IMS network, the control server updates the registration timer in dependence of a control information received from the MSC.

The update procedure of the registration timer of the control server can be executed even if the UE is not able to refresh the IMS registration status over a packet switched PS network. The ongoing registration of the UE in the IMS network will speed up the SR-VCC procedure switching from a CS network to a PS network because no re-registration has to be initiated.

In an embodiment of the invention, the MSC sends the control information to the control server before the registration timer in the control server expires. This will prevent the loss of registration of the UE in the IMS network. A loss of registration during a CS call session of the UE will hamper a possible rSR-VCC (return SR-VCC) procedure when the communication is switched back from a CS network to a PS network.

In an embodiment of the invention, the MSC initiates the update of the registration timer in the control server by sending control information to the control server which comprises the information about the lack of possibility of the UE to update the registration timer. This control information comprises the information that an ongoing CS-communication session between the MSC and the UE is established. The control server takes over the responsibility to update its registration timer for the IMS registration of the UE before it expires without further involving the MSC and the UE in the updating procedure. This will reduce the traffic load in the IMS network because a re-registration of the IMS registration due to the expiry of the registration timer is not necessary.

Advantageously the control information additionally comprises information about the user identity of the UE and/or the equipment identity of the UE. The information about the identity of the user and/or the identity of the user equipment can be used by the control server of the IMS network to check the identity of the PS registration of the user. The control server of the IMS network doesn't need to request additional authentication information which can result in a time delay and additional network traffic.

In a further embodiment after receiving the control information from the MSC, the control server updates the registration timer when the registration timer is close to expire. In other words, the update should be initiated at the latest in due time before the expiry of the registration timer might trigger the termination of the registration. Otherwise a re-registration procedure would have to be initiated when the communication is switched back from a CS network to a PS network which results in additional network traffic and a time delay or interruption in the communication session of the UE. The control server is responsible for the supervision of his local registration timer. No further action is needed from the MSC to supervise this timer. This will reduce the internal workload of the MSC. When a registration timer counts (e.g. counts down) from a start-value to an end-value (e.g. "0") and, after reaching the end-value, initiating a termination of the registration of the UE in the IMS network, an update of the registration timer means to reset the registration timer value to a start-value.

In a further embodiment the MSC triggers the control server to terminate the updating of the registration timer in the control server after the CS-communication session between the UE and the MSC is released. After the release of the communication session, the UE is able to update the registration in IMS on its own.

In a further embodiment of the invention, the MSC requests the registration timer value from the control server of the IMS network and, after receiving the registration timer value and detecting that the registration timer is close to expire, triggers the control server of the IMS network to update the registration timer. The MSC is responsible for the supervision of the registration timer which is located in the control server. The workload for the control server is reduced.

In a further embodiment, the request of the registration timer value also comprises the user identity of the UE and/or the equipment identity of the UE.

In a further embodiment of the invention, the control server, after updating the registration timer, sends a notification message to a serving node of the IMS network which triggers an update of an additional registration timer in the serving node. This additional registration timer in the serving node of the IMS network is needed for managing additional registration purposes in the IMS network.

In a further embodiment the control server of the IMS is a Proxy Call Session Control Function, P-CSCF, server. In a further embodiment the serving node is a Server Call Session Control Function, S-CSCF, server.

In a further embodiment of the invention, the MSC receives the address of the control server of the IMS network, when the registration of the UE at the control server of the IMS network has been established.

In an alternative embodiment of the invention the MSC receives the address of the control server of the IMS network, when the communication session has been established. The MSC requires the address of the control server to build up a communication session between the MSC and the control server.

The present invention also concerns a method for providing service continuity with respect to a registration of a mobile terminal, UE, at a control server of an IP Multimedia Subsystem, IMS, network, while a CS-communication session between the UE and a switching server, MSC, of a circuit-switched, CS, network is established. The MSC sends, for the duration of the established CS-communication, control information to the control server to update a registration timer in the control server which is used for initiating a termination of the registration of the UE at the IMS network, when the registration timer expires.

In an embodiment of the invention, the control server, after receiving the control information from the MSC, updates the registration timer when the registration timer is close to expires.

The present invention also concerns a switching server, MSC, of a circuit-switched network, CS, for providing service continuity with respect to a registration of a mobile terminal, UE, at a control server of an IP Multimedia Subsystem, IMS, network, while a communication session between the UE and the MSC is established. The control server comprises a registration timer which is used for initiating a termination of the registration of the UE at the IMS network, when the registration timer expires. The MSC comprises a unit which is adapted to send control information to the control server. The control information comprises the information about the lack of possibility of the UE to update the registration timer.

In an embodiment, the switching server, MSC, comprises a unit adapted to trigger the control server to terminate the updating of the registration timer in the control server after the CS-communication session between the UE and the MSC is released.

In a further embodiment of the invention, the MSC initiates the update of the registration timer in the control server by requesting the registration timer value from the control server of the IMS network and, after receiving the registration timer value and detecting that the registration timer is close to expire, triggers the control server of the IMS network to update the registration timer In a further embodiment the invention concerns a switching server, MSC, of a circuit-switched network, CS, for providing service continuity of a registration of a mobile terminal, UE, at a control server of an IP Multimedia Subsystem, IMS, network, for the duration of a CS-communication session between the UE and the MSC. The control server comprises a registration timer which is used for initiating a termination of the registration of the UE at the IMS network, when the registration timer expires. The MSC comprises:

- a transmitting unit (31) adapted to send to the control server (3) a request for the registration timer value from of the IMS network and to send a trigger to update the registration timer when the registration timer is close to expire.
- a receiving unit (32) adapted to receive the registration timer value from the control server (3) of the IMS network, a decision unit (33) adapted to make a decision to trigger an update of the registration timer, when the registration timer is close to expire.

In a further embodiment, the request of the registration timer value also comprises the user identity of the UE and/or the equipment identity of the UE.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
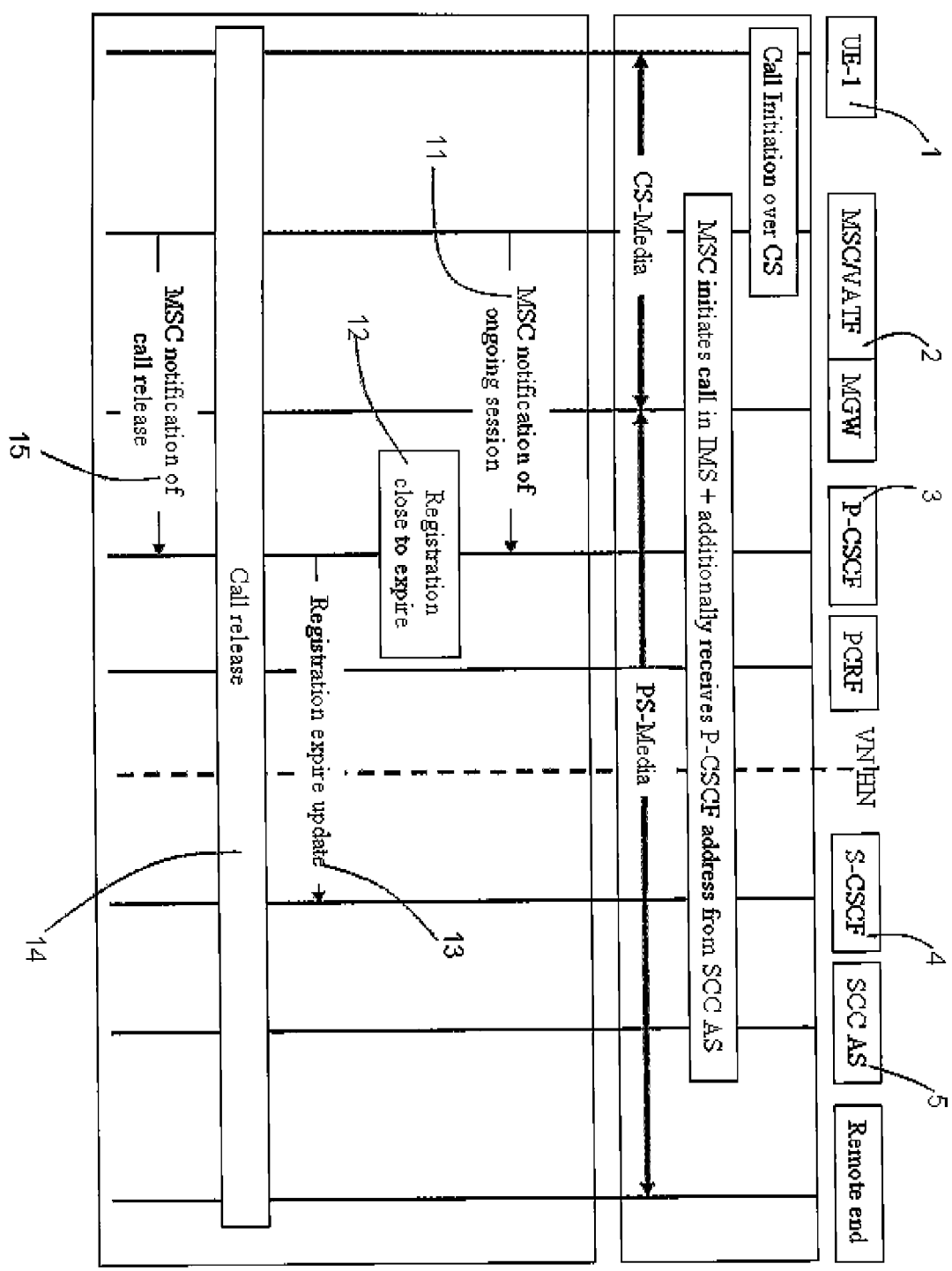
FIG. 1 shows a first exemplary sequence diagram of embodiments of the invention.

FIG. 1 shows an exemplary sequence diagram of a first embodiment of the invention and comprises a mobile terminal UE 1 which has established a circuit switched (CS) session. This CS session has either been initiated in a CS network or has been initiated in a PS network and then transferred to a CS network using the Single Radio Voice Call Continuity (SR-VCC) procedure as specified in the 3GPP standard TS 23.216 Version 9.3.0. The SR-VCC procedure provides a service continuity of Multicast and Broadcast services, when the access system changes and the corresponding services are provided in the target access system. The call of the UE 1, which supports the SR-VCC procedure, is always anchored in the IMS network. The MSC 2, enhanced for SR-VCC, initiates the session transfer procedure to IMS and coordinates it with the CS handover procedure to the target cell. It then sends a PS-CS handover response to a Mobility Management Entity (MME) of the PS network, which includes the necessary CS handover command information for the UE 1 to access the CS network. It is assumed that the CS network does not support the Dual Transfer Mode, DTM, which allows simultaneous transfer of CS and PS data over the same network.

The communication session is established between the UE 1 and a switching server, MSC 2, of the CS network, whereas the MSC 2 is enhanced with the capability to use the Session Initiation Protocol, SIP, or the XML Configuration Access Protocol, XCAP, for the communication with a control server 3 of an IMS network to provide SR-VCC functions.

The control server 3 could be a Proxy Call Session Control Function, P-CSCF, server, which is capable to act as a first point of contact in an IMS network for the registration of a UE 1 to the IMS network. The P-CSCF is a Proxy-Server and authenticates the UE 1. Because other nodes in the IMS trust the P-CSCF, they do not have to authenticate the UE 1 again.

The serving node 4 could be a Server Call Session Control Function, S-CSCF, server, which is capable to act as the central node of an IMS network. The S-CSCF provides routing services and decides which application server should provide their services to the UE 1.

It will be further assumed that the UE 1 has an active IMS registration that has not expired yet. The UE 1 which supports the SR-VCC procedure comprises a local expiration timer which prevents the release of an IMS registration locally in the UE 1 before it expires. The UE 1 updates its expiration timer locally when a CS session or call is ongoing. After the CS session or call is completed, the UE 1 must re-register its registration in the IMS within a given time interval to ensure that it re-synchronized its expiration timer with the registration timer of the IMS. After the CS session is established, the SCC AS 5 sends the address of the P-CSCF 3 the UE 1 is registered through on the PS access to the enhanced MSC 2.

Based on the P-CSCF address, the MSC 2 sends in a first step 11 of the MSC registration expiration update procedure, a notification message of ongoing session to the P-CSCF 3. This notification may include the user identity, the equipment identity of the UE 1 and/or other information required to identify the IMS registration of the user.

The second step 12 of the MSC registration expiration update procedure comprises a supervision of the registration timer in the P-CSCF 3. When the registration of the UE 1 on IMS is close to expiring, the P-CSCF 3 updates its local registration timer. The P-CSCF 3 must therefore be aware of the inability of the UE 1 to update its PS registration. This could be provided by the notification message the MSC 2 sends to the P-CSCF 3 in the first step 11, which can include the information that the UE 1 is not able to update its IMS registration.

The third step 13 is a further embodiment of the invention and comprises the initiation of a re-registration procedure from the P-CSCF 3 to update the registration timer also in the serving node 4 of the IMS network. This serving node 4 can be a Call Session Control Function server, S-CSCF 4. The P-CSCF 3 can indicate in the re-registration message 13 to the S-CSCF 4 that this re-registration is a P-CSCF-registration to avoid that the S-CSCF 4 challenges the P-CSCF 3 for authentication. Another possibility to inform the S-CSCF 4 about a registration timer update is a special notification message 13, which could be sent from the P-CSCF 3 to the S-CSCF 4. This would have the benefit of not impacting the current registration process.

When the call is released 14 by the UE 1 in CS, the MSC 2 sends in a fourth step 15 a notification message to the P-CSCF 3 to initiate a termination of the process of updating the registration timer before expiry. The expiration of the local expiration timer in the UE 1 leads to a re-registration of the UE 1 in the IMS. In a preferred embodiment of this invention the update of registration is performed immediately even if the local expiration timer in the UE 1 is not expiring.

In a further embodiment of the invention, the MSC 2 established a relation to the P-CSCF 3 before the establishment of a CS connection of the UE 1. This could happen if a call in the PS network is initiated and later be transferred to the CS network using a procedure according to the standard 4GPP 23.856, clause 6.4.3.1a. In this scenario, the UE 1 initiates an IMS multimedia session to another UE and uses only PS media flow(s). The request is forwarded to the S-CSCF 4 following normal IMS session set up procedures. The P-CSCF 3 detects the IMS multimedia session and based on the local policy it anchors the session in the MSC 2 prior forwarding the invitation message to the S-CSCF 4. The P-CSCF 3 finds the correct MSC 2 to route to by applying procedures similar to those defined for dynamic user allocation to application servers. The difference to the first embodiment of the invention is that the SCC-AS 5 does not need to send the address of the P-CSCF 3 to the MSC 2.

Figure 2:
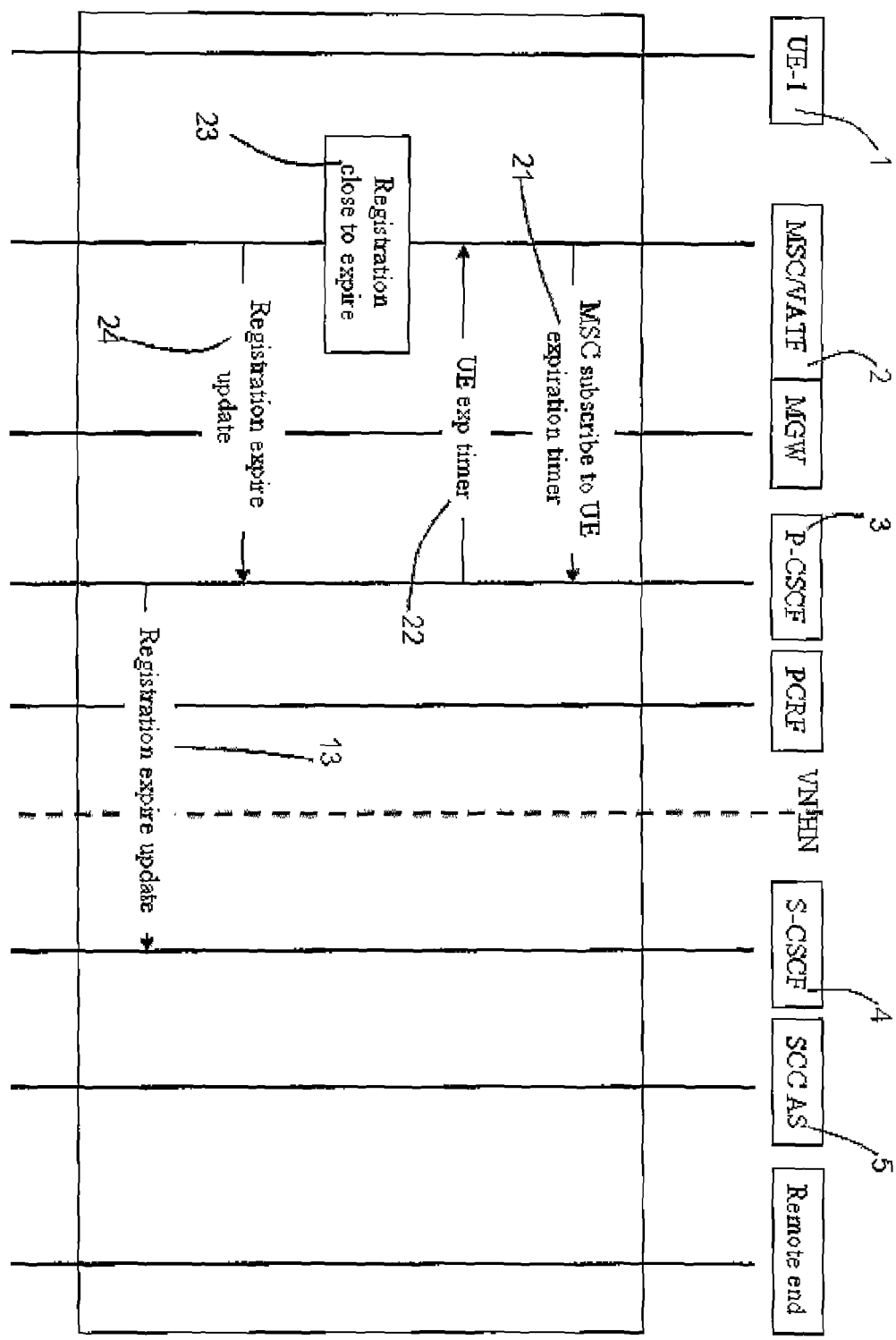
FIG. 2 shows a second exemplary sequence diagram of an alternative embodiment of the invention.

FIG. 2 discloses a third embodiment of the invention and only shows the part of the MSC registration expiration update procedure. It is assumed, that the UE 1 established a call in the CS network. This establishment is according to the embodiments of the invention as shown in FIG. 1. The MSC 2 has determined the address of the P-CSCF. The MSC 2 requests in a first step 21 the P-CSCF of the expiration timer value of the UE 1. This request may also include the user and/or the equipment identity of the UE 1. Also other information which could be required to identify the PS registration of the user could be implemented in the request 21. In a second step 22 of the embodiment according FIG. 2, the P-CSCF 3 returns to the MSC 2 a timer value 22 which indicates the time left the UE 1 has on prior its expiration timer will expire. The request of the first step 21 can be a subscription of the MSC 2 to the P-CSCF 3, i.e. the P-CSCF 3 will inform the MSC 2 about any changes. This could happen e.g. if the coverage situation might have changed and may have allowed that the UE 1 updates the IMS registration on its own. This might be possible if the UE 1 is switched to a network which can handle a PS request or supports DTM. The MSC 2 can request the expiration timer value latest before it expires and while the CS call is still ongoing.

The MSC 2 decides in a third step 23 of the MSC registration expiration update procedure according the embodiment of FIG. 2 to update the registration timer in the P-CSCF 3 prior to the expiry of the expiration timer in the UE 1.

In a fourth step 24 of the embodiment according FIG. 2, the MSC 2 initiates a re-registration to update the registration timer in the P-CSCF 3. To avoid that the P-CSCF 3 will request the MSC 2 for authentication according to a normal re-registration procedure to an IMS network, the MSC 2 may indicate the re-registration procedure as an MSC initiated re-registration procedure. Alternatively, the MSC 2 could send a special notification message to the P-CSCF 3 to update its registration timer. This would advantageously not impact the current registration procedure.

In the fifth step 13, after the P-CSCF 3 updates its local registration timer, it forwards the notification message or the notification of a re-registration procedure to the S-CSCF 4 to update the local registration timer in the S-CSCF 4.

Figure 3:
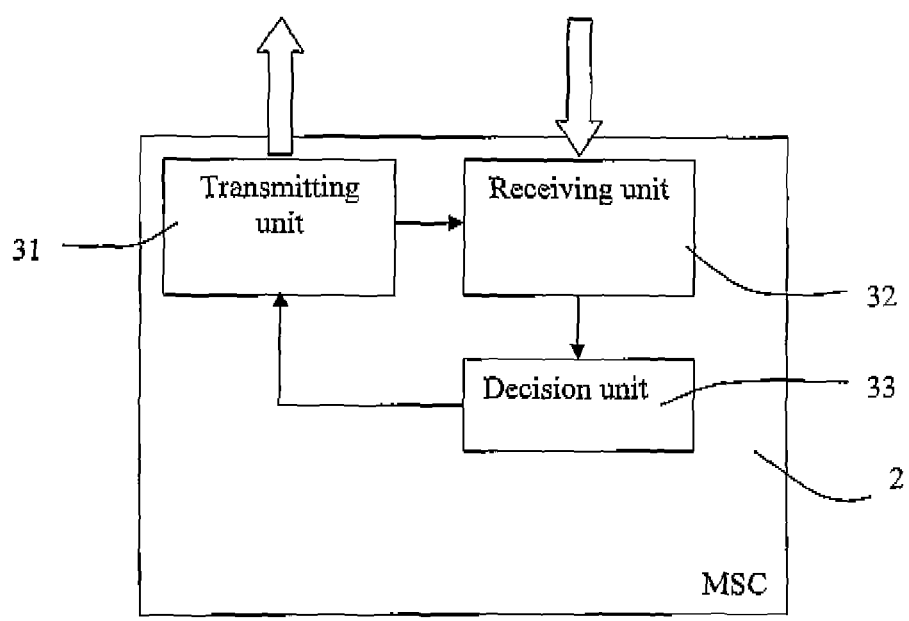
FIG. 3 shows an exemplary block diagram of a switching server, MSC according to an embodiment of the invention.

FIG. 3 shows a block diagram of a switching server, MSC 2, according to an embodiment of the invention. The MSC 2 comprises a transmitting unit 31, adapted to send a request for the registration timer value to the control server 3 of the IMS network and to trigger the control server 3 of the IMS network to update the registration timer when the registration timer is close to expire, a receiving unit 32, adapted to receive the registration timer value from the control server 3 of the IMS network and a decision unit, adapted to make a decision to trigger an update of the registration timer, when the registration timer is close to expire. The transmitting unit 31, receiving unit 32 and the decision unit 33 of the MSC 2 are functional blocks and can be integrated in one or more circuits or one or more other physical entities.

Figure 4:
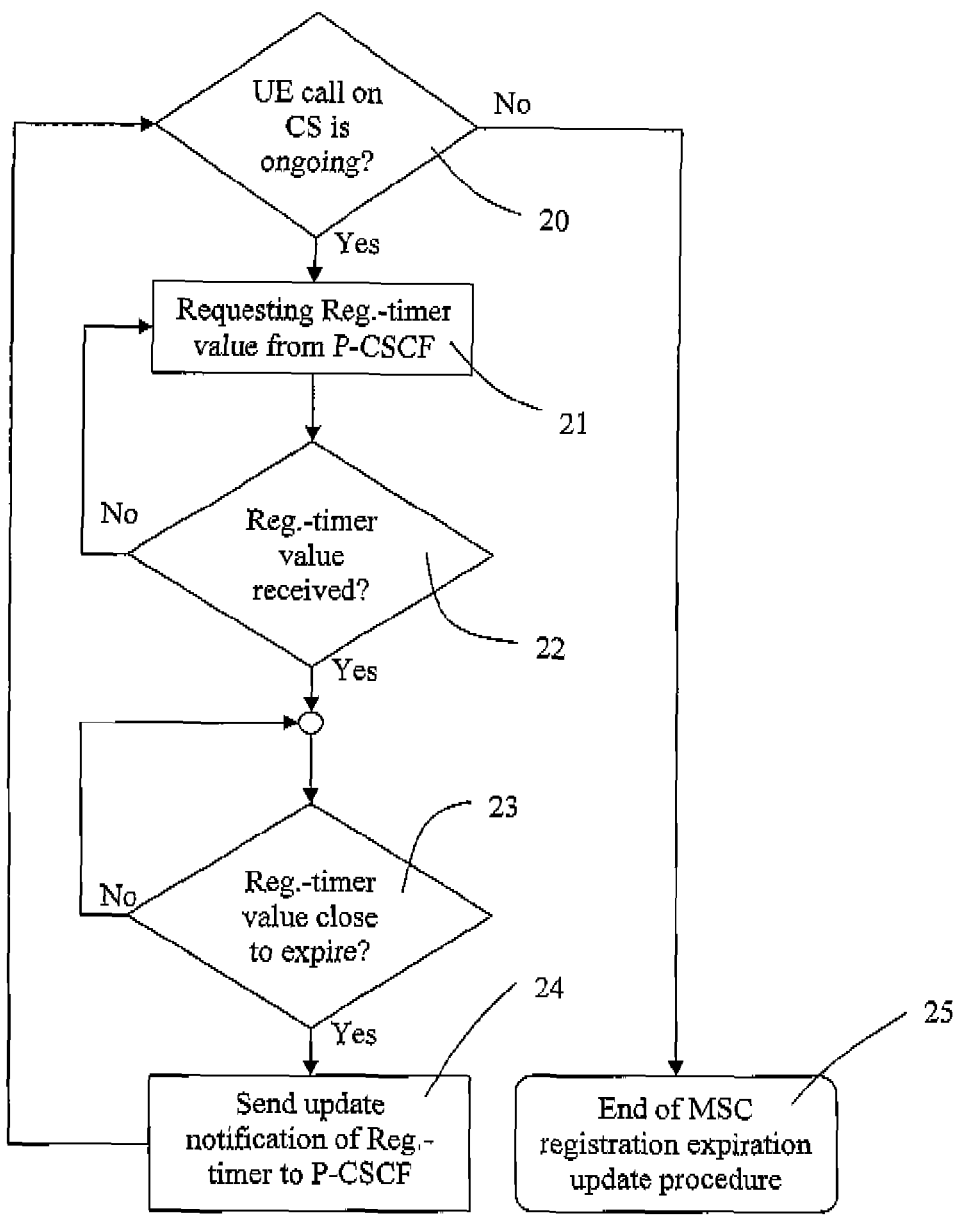
FIG. 4 shows an exemplary flow chart of the functioning of the MSC performing the alternative embodiment of FIG. 2.

FIG. 4 is a flow chart which shows the steps of an embodiment of the invention performed by the switching server, MSC 2. This flow started with a first step 20, which requests a positive indication in the MSC 2 of on ongoing call of a UE 1 in a CS network. If this indication is given, the second step 21 will be performed. The MSC 2 requests a registration timer value from the P-CSCF 3. The third step 22 is a check whether the MSC 2 receives the requested timer or not. If the MSC 2 does not receive the requested registration timer from the P-CSCF 3, a new request is started. If the MSC 2 receives a registration timer value from the P-CSCF 3, it checks in the fourth step 23 if the registration timer is close to expires. If the registration timer is close to expires, the MSC 2 sends in the fifth step 24 a notification message to the P-CSCF 3 to update the registration timer in the P-CSCF 3. When the call of the UE in the CS network stops, the registration expiration update procedure ends 25. The UE 1 is now able to update the registration timer it selves.

The invention claimed is:

1. A method for providing service continuity with respect to a registration of a mobile terminal (UE), at a control server of an IP Multimedia Subsystem (IMS) network, while a Circuit-Switched (CS) communication session between the UE and a switching server (MSC) of a CS network is established, the method comprising:
    initiating a termination of the registration of the UE at the IMS network in response to expiration of a registration timer at the control server;
    delaying, by the control server, expiration of the registration timer at the control server by updating the registration timer, based on control information received from the MSC when the registration timer is close to expiration;
    wherein the MSC initiates the update of the registration timer in the control server by:
        requesting the registration timer value from the control server; and
        after receiving the registration timer value and detecting that the registration timer is close to expiration, triggering the control server to update the registration timer;
    wherein the control server, after updating the registration timer, sends a notification message to a serving node of the IMS network to trigger an update of an additional registration timer in the serving node.

2. The method of claim 1, further comprising sending the control information to the control server before the registration timer expires.

3. The method of claim 1, wherein the control information indicates that the UE will not update the registration timer.

4. The method of claim 3, wherein the control information further comprises information about at least one of:
    a user identity of the UE;
    an equipment identity of the UE.

5. The method of claim 4, wherein the MSC triggers the control server to terminate updating the registration timer in the control server after the communication session between the UE and the MSC is released.

6. The method of claim 1 wherein the request of the registration timer value also comprises at least one of:
    a user identity of the UE;
    an equipment identity of the UE.

7. The method of claim 1 wherein the serving node is a Server Call Session Control Function (S-CSCF) server.

8. The method of claim 1, wherein the control server is a Proxy Call Session Control Function (P-CSCF) server.

9. The method of claim 1, wherein the MSC receives the address of the control server in response to the registration of the UE at the control server.

10. The method of claim 1, wherein the MSC receives the address of the control server when the communication session has been established.

11. A method for providing service continuity with respect to a registration of a mobile terminal (UE), at a control server of an IP Multimedia Subsystem (IMS) network, while a Circuit-Switched (CS) communication session between the UE and a switching server (MSC) of a CS network is established, the method comprising:
- sending, by the MSC, for the duration of the established CS communication session, control information to the control server to delay expiration of a registration timer in the control server, the registration timer used to initiate a termination of the registration of the UE at the IMS network in response to expiration of the registration timer;
- receiving, by the control server, the control information from the MSC and subsequently delaying expiration of the registration timer at the control server by updating the registration timer when the registration timer is close to expiration;
- wherein the MSC initiates the update of the registration timer in the control server by:
    - requesting the registration timer value from the control server;
    - after receiving the registration timer value and detecting that the registration timer is close to expiration, triggering the control server to update the registration timer;
- wherein the control server, after updating the registration timer, sends a notification message to a serving node of the IMS network to trigger an update of an additional registration timer in the serving node.

12. A switching server (MSC) of a circuit-switched (CS) network for providing service continuity with respect to a registration of a mobile terminal (UE) at a control server of an IP Multimedia Subsystem (IMS) network, for the duration of a CS-communication session between the UE and the MSC, the MSC comprising:
- a transmitter configured to:
    - send, to the control server, a request for a registration timer value from of the IMS network;
    - send a trigger to delay expiration of the registration timer at the control server by updating the registration timer when the registration timer is close to expiration;
- a receiver configured to receive the registration timer value from the control server;
- a processor and a memory, the memory containing instructions executable by the processor whereby the MSC is configured to make a decision to trigger delay of-expiration of the registration timer at the control server by updating the registration timer at the control server when the registration timer is close to expiration;
- wherein the control server comprises the registration timer, which is used for initiating a termination of the registration of the UE at the IMS network in response to expiration of the registration timer;
- wherein the control server, after updating the registration timer, sends a notification message to a serving node of the IMS network to trigger an update of an additional registration timer in the serving node.

\* \* \* \* \*